US006551952B2

(12) United States Patent
Wolff et al.

(10) Patent No.: US 6,551,952 B2
(45) Date of Patent: Apr. 22, 2003

(54) LEAD-FREE OPTICAL LIGHT FLINT GLASS MATERIALS

(75) Inventors: Silke Wolff, Hueckeswagen (DE); Peter Brix, Mainz (DE); Ute Woelfel, Mainz (DE)

(73) Assignee: Schott Glas, Mainz (DE)

( * ) Notice: Subject to any disclaimer, the term of this patent is extended or adjusted under 35 U.S.C. 154(b) by 64 days.

(21) Appl. No.: 09/726,132

(22) Filed: Nov. 29, 2000

(65) Prior Publication Data

US 2001/0003725 A1 Jun. 14, 2001

(30) Foreign Application Priority Data

Dec. 4, 1999 (DE) .......................... 199 58 517

(51) Int. Cl.⁷ .......................... C03C 3/083; C03C 3/247
(52) U.S. Cl. .......................... 501/68; 501/57; 501/903
(58) Field of Search .......................... 501/57, 68, 903

(56) References Cited

U.S. PATENT DOCUMENTS

| 4,540,672 A | * | 9/1985 | Boudot et al. ............ 501/64 |
| 4,812,423 A | * | 3/1989 | Kodama et al. ........... 501/55 |
| 4,822,758 A | | 4/1989 | Boudot et al. |
| 5,320,985 A | * | 6/1994 | Enomoto ................. 501/68 |
| 5,332,700 A | * | 7/1994 | Yamaguchi et al. ........ 501/57 |

FOREIGN PATENT DOCUMENTS

| DE | 33 40 005 A1 | | 8/1984 |
| EP | 287345 A | * | 10/1988 |
| EP | 0 645 350 A1 | | 3/1995 |
| GB | 2 137 189 A | | 10/1984 |
| GB | 2 164 932 A | | 4/1986 |
| JP | 56-59640 | | 5/1981 |
| JP | 63265840 A | * | 11/1988 |
| JP | 06092674 A | * | 4/1994 |
| JP | 06107426 A | * | 4/1994 |
| JP | 06107427 A | * | 4/1994 |
| JP | 6-107427 | | 4/1994 |
| JP | 08048538 A | * | 2/1996 |

\* cited by examiner

Primary Examiner—David Sample
(74) Attorney, Agent, or Firm—Michael J. Striker

(57) ABSTRACT

The lead-free optical light flint glass material has a refractive index $n_d$ between 1.54 and 1.61 and an Abbe number $v_d$ of between 38 and 45. It has a composition, based on oxide content, of $SiO_2$ from 52 to 62% by weight, $Al_2O_3$ from 3 to 8% by weight, $Na_2O$ from 7 to 14% by weight, $K_2O$ from 8 to 14% by weight, $TiO_2$ from 13 to 18% by weight, $ZrO_2$ from 0 to 5% by weight, with at least one refining agent, if needed, in an amount suitable for the purposes of refining; and with the proviso that a sum total of $Na_2O$ and $K_2O$ present is greater than 18% by weight.

8 Claims, No Drawings

LEAD-FREE OPTICAL LIGHT FLINT GLASS MATERIALS

BACKGROUND OF THE INVENTION

1. Field of the Invention

The present invention relates to lead-free optical glass materials which have refractive indices $n_d$ of between 1.54 and 1.61 and Abbe numbers $v_d$ of between 38 and 45. Glass materials of this type belong to the optical glass family of the light flint glass materials.

2. Prior Art

Because the glass ingredients PbO and $As_2O_3$ have become the subject of public discussions regarding environmental pollution which they cause, the manufacturers of optical equipment need PbO-free and preferably also $As_2O_3$-free glass materials having the appropriate optical properties.

Simply exchanging the lead oxide for one or more ingredients does not generally allow the PbO-influenced, desired optical and glass technology properties to be reproduced. Instead, new developments or far-reaching changes in the glass composition are required.

Lead-free glass materials with similar optical characteristics and a similar composition are already known.

The closest prior art glass materials are described in JP 56-59640 A. However, the glass materials for spectacles described in that document contain only 11 to 18% by weight alkali metal oxides, which may be composed of $Na_2O$, $K_2O$ and $Li_2O$. Furthermore, they optionally contain the ingredients $Nb_2O_5$, $La_2O_3$ and also $ZrO_2$, which in this case inhibit crystallization but are expensive, as partial replacements for $TiO_2$.

SUMMARY OF THE INVENTION

It is an object of the present invention to provide a lead-free optical glass material with a refractive index $n_d$ of between 1.54 and 1.61 and an Abbe number $v_d$ of between 38 and 45 which can be produced at low cost and have good melting and processing properties. This also includes the requirement for sufficient crystallization stability.

According to the invention the lead-free optical glass material with a refractive index $n_d$ of between 1.54 and 1.61 and an Abbe number $v_d$ of between 38 and 45 has a composition, based on oxide content, of:

| | |
|---|---|
| $SiO_2$ | from 52 to 62% by weight, |
| $Al_2O_3$ | from 3 to 8% by weight, |
| $Na_2O$ | from 7 to 14% by weight, |
| $K_2O$ | from 8 to 14% by weight, |
| $TiO_2$ | from 13 to 18% by weight, |
| $ZrO_2$ | from 0 to 5% by weight, | and at least one refining agent, if needed, in an amount suitable for the purposes of refining; with the proviso that a sum total of $Na_2O$ and $K_2O$ present is greater than 18% by weight.

The glass materials according to the invention contain the glass formers $SiO_2$ and $Al_2O_3$, in balanced proportions of 52 to 62% by weight $SiO_2$ and 3 to 8% by weight $Al_2O_3$. In this way, both the meltability of the glass materials, which deteriorates as the $Al_2O_3$ content rises, and their chemical durability, which would deteriorate if the $Al_2O_3$ content were too low, are satisfactory. Moreover, if the above-mentioned minimum $Al_2O_3$ content were to be increased, the risk of devitrification would rise excessively. There is no $B_2O_3$, which is a common third glass former, used, which is of benefit to the chemical durability of the glass materials. An $SiO_2$ content of between 53 and 59% by weight is preferred, but an $SiO_2$ content of between 55 and 59% is particularly preferred. The $Al_2O_3$ content is preferably between 4 and 7% by weight, particularly preferably between 5 and 7% by weight.

To obtain the desired high refractive index combined, at the same time, with a low Abbe number, the glass materials contain relatively large amounts of $TiO_2$, at 13 to 18% by weight. The $TiO_2$ content is preferably between 14 and 17% by weight, particularly preferably between 15 and 17% by weight. In addition to $TiO_2$, the glass materials according to the invention may also contain up to 5% by weight $ZrO_2$. The presence of the two ingredients improves the chemical durability, in particular the alkali resistance. If the levels were to be higher, the crystallization stability would be considerably reduced. Preferably, the sum of the $TiO_2$ and $ZrO_2$ is less than 18% by weight. In preferred embodiments, there is no $ZrO_2$.

To improve the meltability, that is to reduce the melting temperatures, with the given high level of glass formers, the glass materials contain from 7 to 14% by weight $Na_2O$ and 8 to 14% by weight $K_2O$ as fluxing agents. If the levels were to be higher, in particular in relation to the high $TiO_2$ content, the tendency towards crystallization would rise excessively. Therefore, the sum of $R_2O$ and $TiO_2$ is preferably less than or equal to 42% by weight. For the same reason, $LiO_2$ is dispensed with altogether. Increasing the alkali metal content further would also mean that the desired range of refractive indices would not be reached. The sum of $Na_2O$ and $K_2O$ is at least greater than 18% by weight. An $Na_2O$ content of 8 to 13% by weight and a $K_2O$ content of 10 to 14% by weight are preferred. An $Na_2O$ content of 8 to 11% by weight and a $K_2O$ content 10 to 12% by weight are particular preferred.

To improve the quality of the glass, one or more refining agents, which are known per se, may be added in the customary amounts to the batch in order to refine the glass material. This provides the glass material with a particularly good internal glass quality with regard to the freedom from bubbles and cords.

If the refining agent used is not $As_2O_3$, but rather, instead, $Sb_2O_3$, for example, which is possible without any loss in glass quality, the lead-free glass materials according to the invention are additionally free of arsenic.

The $Sb_2O_3$ content is preferably between 0.1 and 0.5% by weight. It is also preferable for the glass materials, if appropriate in addition to $Sb_2O_3$, to contain up to 0.5% by weight fluoride, which likewise has a refining action. Fluoride is added, for example, as NaF.

In addition to a refractive index $n_d$ of between 1.54 and 1.61, and an Abbe number of between 38 and 45, and a positive anomalous partial dispersion in the blue region of the spectrum, the glass materials according to the invention have the benefits as described in the following paragraphs.

The glass materials are PbO-free and, in a preferred embodiment are also $As_2O_3$-free. The glass materials exhibit good crystallization stability. This allows production in a continuously operating melting unit. A measure of the crystallization stability being sufficient for production of this nature is the viscosity at the liquidus temperature. For continuous production, it should be $\geq 1000$ dPas. This condition is satisfied with the glass materials according to the invention. Since the glass materials exhibit a crystallization stability of this nature, further thermal treatment of the glass materials, such as pressing or repressing, also becomes possible. It is advantageous that it is possible to dispense with the expensive ingredients $Nb_2O_5$ and $La_2O_3$ while the glass materials, despite the high $TiO_2$ content, still exhibit a sufficient crystallization stability, this fact also being contributed to by the fact that alkaline-earth metal oxides are eliminated altogether. Therefore, apart from inevitable impurities, the glass materials are free of alkaline-earth metal oxides, $Nb_2O_5$ and $La_2O_5$.

In addition, the "length of the glass materials" (viscosity curve which falls slowly with temperature) ensures good processability despite the relatively high melting temperatures of approximately 1400° C.

The glass materials have an exceptional alkali resistance, as attested to by the fact that they belong to the alkali resistance class AR=1, while also retaining a chemical durability which is adequate in other respects. The chemical durability of the glass materials is of importance for their further processing, such as grinding and polishing.

Glass materials within a compositional range (in % by weight based on oxides) $SiO_2$ from 52 to 62, preferably from 53 to 59, % by weight; $Al_2O_3$ from 3 to 8, preferably from 4 to 7, % by weight; $Na_2O$, from 7 to 14% by weight, $K_2O$ from 8 to 14% by weight, with a sum of $Na_2O$ and $K_2O$ greater than 18% by weight; preferably $Na_2O$ from 8 to 13% by weight and $K_2O$ from 10 to 14% by weight; $TiO_2$ from 13 to 18, preferably from 14 to 17, % by weight; $ZrO_2$ from 0 to 5% by weight, with a sum total of $TiO_2$ and $ZrO_2$ present is not greater than 18% by weight, preferably $ZrO_2$-free; have a refractive index $n_d$ of between 1.55 and 1.60 and an Abbe number $v_d$ of between 39 and 44. Glass materials of composition (% by weight based on oxides present) $SiO_2$ from 55 to 59% by weight; $Al_2O_3$ from 5 to 7% by weight; $Na_2O$, from 8 to 11% by weight; $K_2O$, from 10 to 12% by weight, with a sum of $Na_2O+K_2O$ greater than 18% by weight, $TiO_2$ from 15 to 17% by weight have a refractive index $n_d$ of between 1.56 and 1.59 and an Abbe number $v_d$ of between 39 and 44.

EXAMPLES

Six examples of glass materials according to the invention were melted from standard raw materials.

Table 2 lists the respective composition (in % by weight based on oxides), the refractive index $n_d$, the Abbe number $v_d$, the partial dispersion in the blue region of the spectrum $P_{g,F}$ and the anomaly of this partial dispersion $\Delta P_{g,F}$ $[10^{-4}]$, the density $\rho[g/cm^3]$, the coefficient of thermal expansion $\alpha_{20/300}$ $[10^{-6}/K]$ and the transformation temperature $T_g$ [° C.] for the glass materials.

The glass materials according to the invention were produced as follows:

The raw materials for the oxides, preferably carbonates and nitrates, were premixed, the refining agent was added and then thorough mixing took place. The glass batch was melted in a discontinuous melting unit at melting temperatures of between approximately 1400° C. and 1450° C., then refined and extensively homogenized. The casting temperature was approximately 1300° C.

Table 1 shows a melting example.

TABLE 1

Example of how to melt 100 kg of calculated glass

| Oxide | % by weight | Raw material | Weighed-in quantity (kg) |
|---|---|---|---|
| $SiO_2$ | 51.7 | $SiO_2$ | 51.72 |
| $Al_2O_3$ | 8.0 | $Al(OH)_3$ | 12.35 |
| $Na_2O$ | 8.0 | $Na_2CO_3$ | 13.70 |
| $K_2O$ | 14.0 | $K_2CO_3$ | 20.59 |
| $TiO_2$ | 17.0 | $TiO_2$ | 17.10 |
| $ZrO_2$ | 1.0 | $ZrO_2$ | 1.02 |
| $Sb_2O_3$ | 0.3 | $Sb_2O_3$ | 0.30 |

The properties of the glass material obtained in this way are given in Table 2, Example 2.

TABLE 2

Composition (in % by weight based on oxide) of glass materials according to the invention, and significant properties of the glass materials

| | 1 | 2 | 3 | 4 | 5 | 6 |
|---|---|---|---|---|---|---|
| $SiO_2$ | 52.7 | 51.7 | 54.7 | 62.0 | 58.7 | 54.7 |
| $Al_2O_3$ | 7.0 | 8.0 | 4.0 | 3.0 | 5.0 | 7.0 |
| $Na_2O$ | 13.0 | 8.0 | 13.0 | 14.0 | 9.0 | 11.0 |
| $K_2O$ | 11.0 | 14.0 | 14.0 | 8.0 | 10.0 | 12.0 |
| $TiO_2$ | 16.0 | 17.0 | 14.0 | 13.0 | 17.0 | 15.0 |
| $ZrO_2$ | | 1.0 | | | | |
| $Sb_2O_3$ | 0.3 | 0.3 | 0.3 | | 0.3 | 0.3 |
| $n_d$ | 1.5829 | 1.5906 | 1.5705 | 1.5663 | 1.58763 | 1.57648 |
| $V_d$ | 41.44 | 39.81 | 43.82 | 43.88 | 39.67 | 42.33 |
| $P_{g,F}$ | 0.5764 | 0.5797 | 0.5713 | 0.5709 | 0.5804 | 0.5737 |
| $\Delta P_{g,F}$ $[10^{-4}]$ | 23 | 29 | 12 | 9 | 33 | 11 |
| $\rho[g/cm^3]$ | 2.61 | 2.61 | 2.60 | 2.57 | 2.59 | 2.59 |
| $\alpha_{20/300}$ $[10^{-6}/K]$ | 11.2 | 10.2 | 12.2 | 10.4 | 9.2 | 10.7 |
| $T_g$ [° C.] | 558 | 575 | 525 | 541 | 582 | 557 |

We claim:

1. A lead-free optical glass material with a refractive index $n_d$ of between 1.54 and 1.61 and an Abbe number $v_d$ of between 38 and 45, said glass material consisting, based on oxide content, of

| $SiO_2$ | from 52 to 62% by weight, |
|---|---|
| $Al_2O_3$ | from 3 to 8% by weight, |
| $Na_2O$ | from 7 to 14% by weight, |
| $K_2O$ | from 8 to 14% by weight, |
| $TiO_2$ | from 13 to 18% by weight, |
| $ZrO_2$ | from 0 to 5% by weight, | and from 0.1 to 0.5% by weight of $Sb_2O_3$ as refining agent; and with the proviso that a sum total of said $Na_2O$ and said $K_2O$ present is greater than 18% by weight.

2. A lead-free optical glass material with a refractive index $n_d$ of between 1.55 and 1.60 and an Abbe number $v_d$ of between 39 and 44, said glass material consisting, based on oxide content, of

| $SiO_2$ | from 52 to 62% by weight, |
|---|---|
| $Al_2O_3$ | from 3 to 8% by weight, |
| $Na_2O$ | from 7 to 14% by weight, |
| $K_2O$ | from 8 to 14% by weight, |
| $TiO_2$ | from 13 to 18% by weight, |
| $ZrO_2$ | from 0 to 5% by weight, | and from 0.1 to 0.5% by weight of $Sb_2O_3$ as refining agent;

with the proviso that a sum total of said $Na_2O$ and said $K_2O$ present is greater than 18% by weight; and with the proviso that a sum total of said $TiO_2$ and said $ZrO_2$ present is not greater than 18% by weight.

3. A lead-free optical glass material with a refractive index $n_d$ of between 1.55 and 1.60 and an Abbe number $v_d$ of between 39 and 44, said glass material consisting, based on oxide content, of

| | |
|---|---|
| $SiO_2$ | from 52 to 62% by weight, |
| $Al_2O_3$ | from 3 to 8% by weight, |
| $Na_2O$ | from 7 to 14% by weight, |
| $K_2O$ | from 8 to 14% by weight, |
| $TiO_2$ | from 13 to 18% by weight, |
| $ZrO_2$ | from 0 to 5% by weight, | and from 0.1 to 0.5% by weight of $Sb_2O_3$ and at least one fluoride in an amount of up to 5% by weight as refining agent; and with the proviso that a sum total of said $Na_2O$ and said $K_2O$ present is greater than 18% by weight.

4. A lead-free optical glass material with a refractive index $n_d$ of between 1.55 and 1.60 and an Abbe number $v_d$ of between 39 and 44, said glass material consisting, based on oxide content of

| | |
|---|---|
| $SiO_2$ | from 53 to 69% by weight, |
| $Al_2O_3$ | from 4 to 7% by weight, |
| $Na_2O$ | from 8 to 13% by weight, |
| $K_2O$ | from 10 to 14% by weight, |
| $TiO_2$ | from 14 to 17% by weight, | and at least one refining agent, if needed, in an amount suitable for the purposes of refining; and with the proviso that a sum total of said $Na_2O$ and said $K_2O$ present is greater than 18% by weight.

5. A lead-free optical glass material with a refractive index $n_d$ of between 1.56 and 1.59 and an Abbe number $v_d$ of between 39 and 44, said glass material consisting, based on oxide content, of

| | |
|---|---|
| $SiO_2$ | from 55 to 59% by weight, |
| $Al_2O_3$ | from 5 to 7% by weight, |
| $Na_2O$ | from 8 to 11% by weight, |
| $K_2O$ | from 10 to 12% by weight, |
| $TiO_2$ | from 15 to 17% by weight, | and at least one refining agent, if needed, in an amount suitable for the purposes of refining; and with the proviso that a sum total of said $Na_2O$ and said $K_2O$ present is greater than 18% by weight.

6. A lead-free optical glass material as defined in claim 4 or 5, wherein said at least one refining agent comprises $Sb_2O_3$ and said amount of said $Sb_2O_3$ is from 0.1 to 0.5% by weight.

7. A lead-free optical glass material as defined in claim 4 or 5, wherein said at least one refining agent comprises at least one fluoride and up to 0.5 percent by weight of said at least one fluoride is present.

8. A lead-free optical glass material as defined in claim 4 or 5, and substantially free of arsenic oxide above a level of inevitable impurities.

* * * * *